(12) United States Patent
Lagakos et al.

(10) Patent No.: US 7,460,740 B2
(45) Date of Patent: Dec. 2, 2008

(54) INTENSITY MODULATED FIBER OPTIC STATIC PRESSURE SENSOR SYSTEM

(75) Inventors: Nicholas Lagakos, Silver Spring, MD (US); Joseph A Bucaro, Herndon, VA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/250,708

(22) Filed: Oct. 7, 2005

(65) Prior Publication Data

US 2006/0072887 A1      Apr. 6, 2006

Related U.S. Application Data

(63) Continuation-in-part of application No. 10/446,256, filed on May 28, 2003, now Pat. No. 7,020,354.

(60) Provisional application No. 60/383,577, filed on May 28, 2002.

(51) Int. Cl.
*G02B 6/26* (2006.01)
(52) U.S. Cl. .......................................... 385/12; 385/13
(58) Field of Classification Search ............. 385/12–13, 385/117
See application file for complete search history.

(56) References Cited

U.S. PATENT DOCUMENTS

| 4,085,254 | A |   | 4/1978  | Atkins |
|---|---|---|---|---|
| 4,162,397 | A |   | 7/1979  | Bucaro et al. |
| 4,238,856 | A |   | 12/1980 | Bucaro et al. |
| 4,278,743 | A |   | 7/1981  | Thompson |
| 4,363,114 | A |   | 12/1982 | Bucaro et al. |
| 4,427,263 | A |   | 1/1984  | Lagakos et al. |
| 4,472,022 | A |   | 9/1984  | Bearcroft et al. |
| 4,482,205 | A |   | 11/1984 | Lagakos et al. |
| 4,621,896 | A |   | 11/1986 | Lagakos et al. |
| 4,799,751 | A | * | 1/1989  | Tekippe ........................ 385/12 |
| 4,805,630 | A | * | 2/1989  | Storey ......................... 600/488 |
| 4,979,798 | A |   | 12/1990 | Lagakos et al. |

(Continued)

OTHER PUBLICATIONS

Miers, D.R. ,Raj, D., Berthold, J.W. , "Design and characterization of fiber optic accelerometer," Fiber Optic and Laser Sensors V, Proc. Soc., SPIE vol. 838, pp. 314-317 (1987).

(Continued)

*Primary Examiner*—Frank G Font
*Assistant Examiner*—Eric Wong
(74) *Attorney, Agent, or Firm*—John J Karasek; Sally A Ferrett

(57) ABSTRACT

A fiber optic sensor for measuring static pressure includes a cartridge housing having an end that is exposed to the atmosphere, a thin flexible membrane covering the exposed end of the cartridge housing such that the flexible membrane has an exposed side and a protected side, and a fiber bundle disposed within the cartridge housing, the fiber bundle comprising at least one fiber having a first polished end for transmitting light toward the membrane and a second end for being coupled to a light source or a receiver, the housing arranged to maintain the membrane at a distance from the first end of the fiber in a direction along a fiber axis, with free space between the first fiber end and the protected side of the flexible membrane.

16 Claims, 14 Drawing Sheets

U.S. PATENT DOCUMENTS

| | | | |
|---|---|---|---|
| 4,994,668 A | | 2/1991 | Lagakos et al. |
| 5,146,083 A | * | 9/1992 | Zuckerwar et al. ..... 250/227.21 |
| 5,158,838 A | | 10/1992 | Bjordal et al. |
| 5,242,768 A | | 9/1993 | Nagatsuka et al. |
| 5,258,614 A | * | 11/1993 | Kidwell et al. ......... 250/227.16 |
| 5,279,793 A | * | 1/1994 | Glass ..................... 422/82.06 |
| 5,288,564 A | | 2/1994 | Klein et al. |
| 5,367,376 A | | 11/1994 | Lagakos et al. |
| 5,427,871 A | | 6/1995 | Garshol et al. |
| 5,633,960 A | | 5/1997 | Lagakos et al. |
| 5,770,945 A | | 6/1998 | Constable |
| 5,805,753 A | | 9/1998 | Lagakos et al. |
| 5,825,489 A | | 10/1998 | Lagakos et al. |
| 5,922,903 A | | 7/1999 | Pujado |
| 6,118,534 A | | 9/2000 | Miller |
| 6,281,976 B1 | | 8/2001 | Taylor et al. |
| 6,738,145 B2 | | 1/2002 | Sherrer et al. |
| 6,439,055 B1 | | 8/2002 | Maron et al. |
| 6,462,445 B1 | | 10/2002 | Weber et al. |
| 6,539,136 B1 | | 3/2003 | Dianov et al. |
| 6,575,248 B2 | | 6/2003 | Zhang et al. |
| 6,577,402 B1 | | 6/2003 | Miller |
| 6,597,820 B1 | | 7/2003 | Sheem |
| 6,622,549 B1 | * | 9/2003 | Wlodarczyk et al. ...... 73/119 A |
| 6,701,775 B1 | | 3/2004 | Popielas et al. |
| 6,717,337 B2 | | 4/2004 | Howarth et al. |
| 6,738,537 B2 | * | 5/2004 | Sheem ........................ 385/12 |
| 6,913,854 B1 | | 7/2005 | Alberte et al. |
| 7,187,453 B2 | | 3/2007 | Belleville et al. |
| 2002/0176592 A1 | | 11/2002 | Howarth et al. |
| 2004/0099800 A1 | | 5/2004 | Lagakos et al. |
| 2004/0151417 A1 | | 8/2004 | Lagakos et al. |

OTHER PUBLICATIONS

Lagakos, N., Trott, W., Hickman, T., Cole, J., Bucaro, J., "Microbend fiber-optic sensor as extended hydrophone", IEEE Journal of Quantum Electronics, vol. 18, Issue 10, pp. 1633-1638, Oct. 1982.

Bucaro, J.A., Lagakos, N., "Lightweight Fiber Optic Microphones and Accelerometers", Review of Scientific Instruments, vol. 72, pp. 2816-2821, Jun. 2001.

Zuckerman, A.J., Cuomo, T.D., Nguyen, T.D., Rizzi, S.A., Clevenson, S.A., "High Temperature Fiber-Optic Lever Microphones", J. Acoustical Society of America, vol. 97, Issue 6, pp. 3605-3616, Jun. 1995.

Krohn, D.A., Fiber Optic Sensors—Fundamentals and Applications, Instrument Society of America, Research Triangle Park, NC, Chapters 3 and 8, 1992.

Lagakos, N., Cole, J.H., Bucaro, J.A., "Microbend Fiber-optic Sensor", Applied Optics 26, pp. 2171-2180, Jun. 1987.

Hu, A., Cuomo, F.W., Zuckerwar, J., "Theoretical and Experimental Study of a Fiber Optic Microphone", J. Acoustical Society of America, vol. 91, pp. 3049-3060, 1992.

He, G. and Cuomo, F.W., "Displacement Response, Detection Limit, and Dynamic Range of Fiber-Optic Lever Sensors", J. Lightwave Tech., vol. 9, No. 11, Nov. 1991, pp. 1618-1625.

\* cited by examiner

| MICROPHONE | FIBER OPTIC NRL-7130 | 4938 (PREAMPLIFIER: 2669L) BRUEL & KJAER | 130A10 (PREAMPLIFIER: 130P11) THE MODAL SHOP, INC. |
|---|---|---|---|
| SENSING ELEMENT | REFLECTION DIAPHRAGM | CAPACITIVE DIAPHRAGM | PZT |
| LINEARITY | 1% | 1% | 3% |
| DYNAMIC RANGE | 85 dB (EXPECTED: 120 dB) | 120 dB | 93 dB |
| MINIMUM DETECTABLE PRESSURE | $0.016$ Pa/$Hz^{1/2}$ (POSSIBLE: 11:2 $\mu Pa/Hz^{1/2}$) | $0.004$ Pa/$Hz^{1/2}$ | $0.003$ $\mu Pa/Hz^{1/2}$ |
| BANDWIDTH | 0.01- 30 kHz | 0.01- 70 kHz | 0.01- 20 kHz |
| ACCELERATION SENSITIVITY | AXIAL 3 Pa/g TRANS. 1 Pa/g | 0.6 Pa/g | 0.1 Pa/g |
| SIZE | (DIAPHRAGM DIAMETER: 0.125") 0.25" o.d. 1.5" LONG | SENSOR 0.25" o.d. 0.41" LONG PREAMPLIFIER: 0.5" 2.5" LONG | SENSOR 0.25" 1" LONG PREAMPLIFIER: 0.25" o.d. 2.125" LONG |
| WEIGHT | 1.3 gm | SENSOR 1.7 gm PREAMPLIFIER: 43 gm | SENSOR 2.2 gm PREAMPLIFIER: 3.75 gm |
| ELECTRICAL REQUIREMENT | SENSOR OPTICAL LED-PIN: REMOTE (<200 mW) | POLARIZATION VOLTAGE: 200V | PREAMPLIFIER: >400 mW |
| COST | EXPECTED: $25 | SENSOR: $913 PREAMPLIFIER: $753 | SENSOR: $110 PREAMPLIFIER: $455 |

FIG. 8

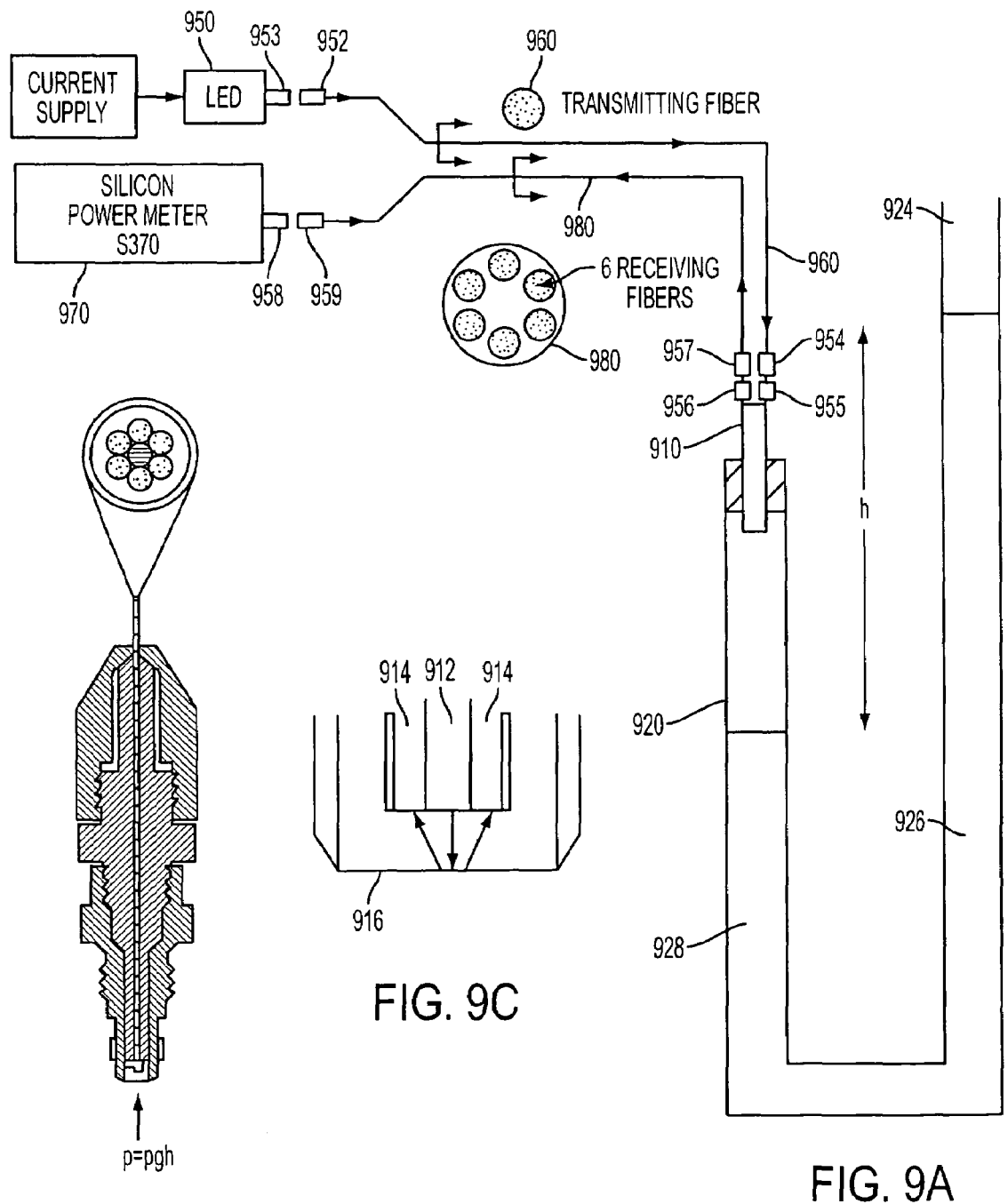

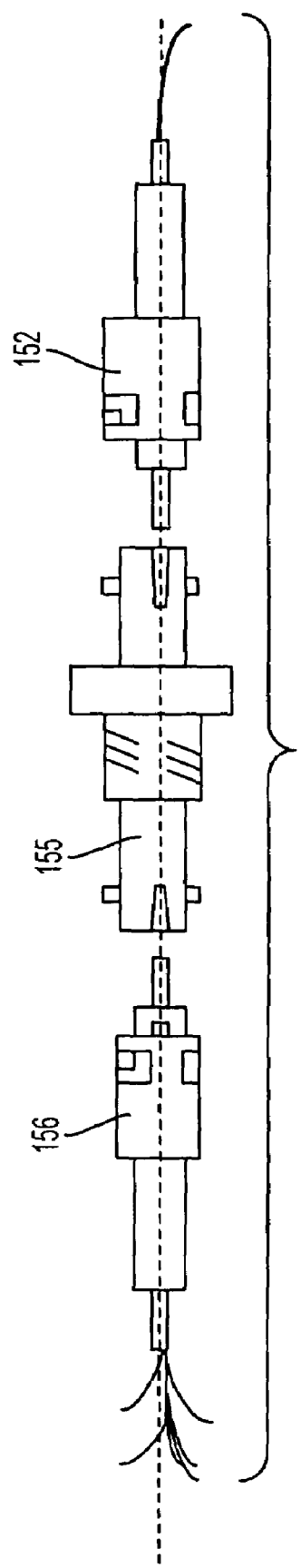
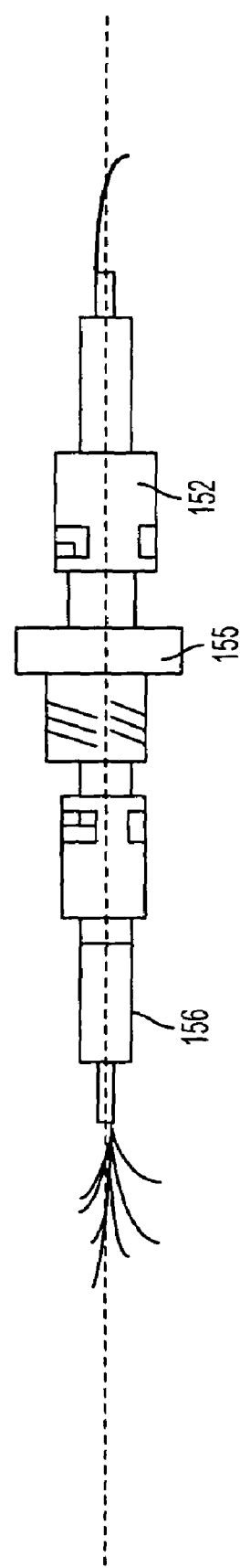
FIG. 14A
FIG. 14B

INTENSITY MODULATED FIBER OPTIC STATIC PRESSURE SENSOR SYSTEM

The present application is a continuation-in-part of patent application Ser. No. 10/446,256, entitled "Intensity Modulated Fiber Optic Pressure Sensor" filed in the United States on May 28, 2003, which claims the benefit of provisional patent application No. 60/383,577 filed on May 28, 2002, each of which are incorporated by reference in their entirety.

FIELD OF THE INVENTION

This invention relates in general to the field of pressure sensors and in particular to the field of fiber optic pressure sensors.

BACKGROUND

Active sound control systems often require, in addition to actuator and electronic control components, specialized sensor devices. The requirements associated with such sensors to a large part are determined by the particular active control approach employed, as well as the kind of performance expected of the sound controlling system. One type of sensor is the microphone, which measures sound or the existence of atmospheric pressure waves in a particular area of interest.

These sensors are often used as components of instrumentation packages employed on missiles, satellites or other rocket payloads, aircraft or other mechanisms in which atmospheric pressure waves, acceleration or vibration can be quite severe. When in employed in such environments, weight becomes a critical variable. A 10 gram weight differential at rest becomes a 150 gram weight difference during a 15G acceleration event.

While various electro magnetic microphones offer high levels of sensitivity and good performance in terms of size and efficiency, these electromagnetic devices are often very sensitive to EMI and aren't always physically robust. The hardening of these devices to EMI almost invariably causes an increase in physical size, weight, sensitivity and expense.

The main emphasis has been given to phase modulated interferometric fiber optic sensors for detecting pressure and strain. Though interferometric type sensors offer very high sensitivity, polarization effects and high cost have delayed the implementation of these sensors to commercial applications. Frequency modulated sensors utilizing fiber gratings are very promising for monitoring strain in different location along one fiber.

One solution is to employ microphones that are not electrical or semiconductor in nature. The use of fiber optics for sensors in general, and for sound detection in particular, are one option available to designers which simultaneously solves the EMI sensitivity, size and weight problems inherent in electrical sensors.

Since fiber optics use light rather than electricity, a fiber optic microphone is generally insensitive to EMI, or EMF and is therefore more efficient in an environment that has a large amount of electro magnetic energy. As a result, fiber optic microphones can be located adjacent to or actually attached to electronic devices that generate large electro magnetic fields without negative affects to either the microphone or the area of interest.

Intensity modulated fiber optic sensors, while often less sensitive than comparable interferometric sensors, are simpler and less expensive.

Therefore it is an object of this invention to offer an intensity modulated fiber optic pressure sensor that is small and lightweight.

It is yet a further object to offer a pressure sensor that is EMI insensitive.

It is a further object of this invention to offer a pressure sensor that features high levels of sensitivity.

It is a yet another object offer a pressure sensor that is physically robust.

It is a further object of this invention to offer a pressure sensor that is economical.

SUMMARY

One embodiment of the invention is directed to a fiber optic pressure sensor that includes a cartridge housing having an end that is exposed to the atmosphere, and a thin flexible membrane covering the exposed end of the cartridge housing such that the flexible membrane has an exposed side and a protected side. A fiber bundle is disposed within the cartridge housing, featuring a transmitting fiber having a first and second ends. The first end has a polished finish and the second end is coupled to a light source. The fiber bundle also features a multitude of receiving fibers disposed around the transmitting fiber with each receiving fiber having first and second ends where the first ends are also polished. The fiber bundle is disposed within the cartridge housing such that the first end of the transmitting fiber and the first end of each receiving fiber is adjacent to the protected side of the flexible membrane with free space between the first fiber end and the protected side of the flexible membrane. A light sensing means is coupled to second end of said receiving fibers wherein light launched into the transmitting fiber propagates emerges at the polished end, propagates a very short distance in air, and is reflected by the flexible membrane into the receiving fibers, propagates therethrough, and is detected by light sensing means. Upon a change in the atmospheric pressure, pressure waves cause the flexible membrane to distort causing a change in the amount of light reflected by the protected side of the flexible membrane. The intensity of the light coupled into the sensing fibers is modulated in relation to the intensity of pressure wave.

BRIEF DESCRIPTION OF THE DRAWINGS

FIG. 8 illustrates the performance characteristics of an exemplary seven fiber microphone/pressure sensor.

FIG. 9 illustrates a seven fiber static pressure sensor in accordance with an embodiment of the invention in operation.

FIG. 14A-14B illustrate connectors suitable for use in a sensor system according to an embodiment of the invention.

DETAILED DESCRIPTION OF PREFERRED EMBODIMENTS

Figure 1:
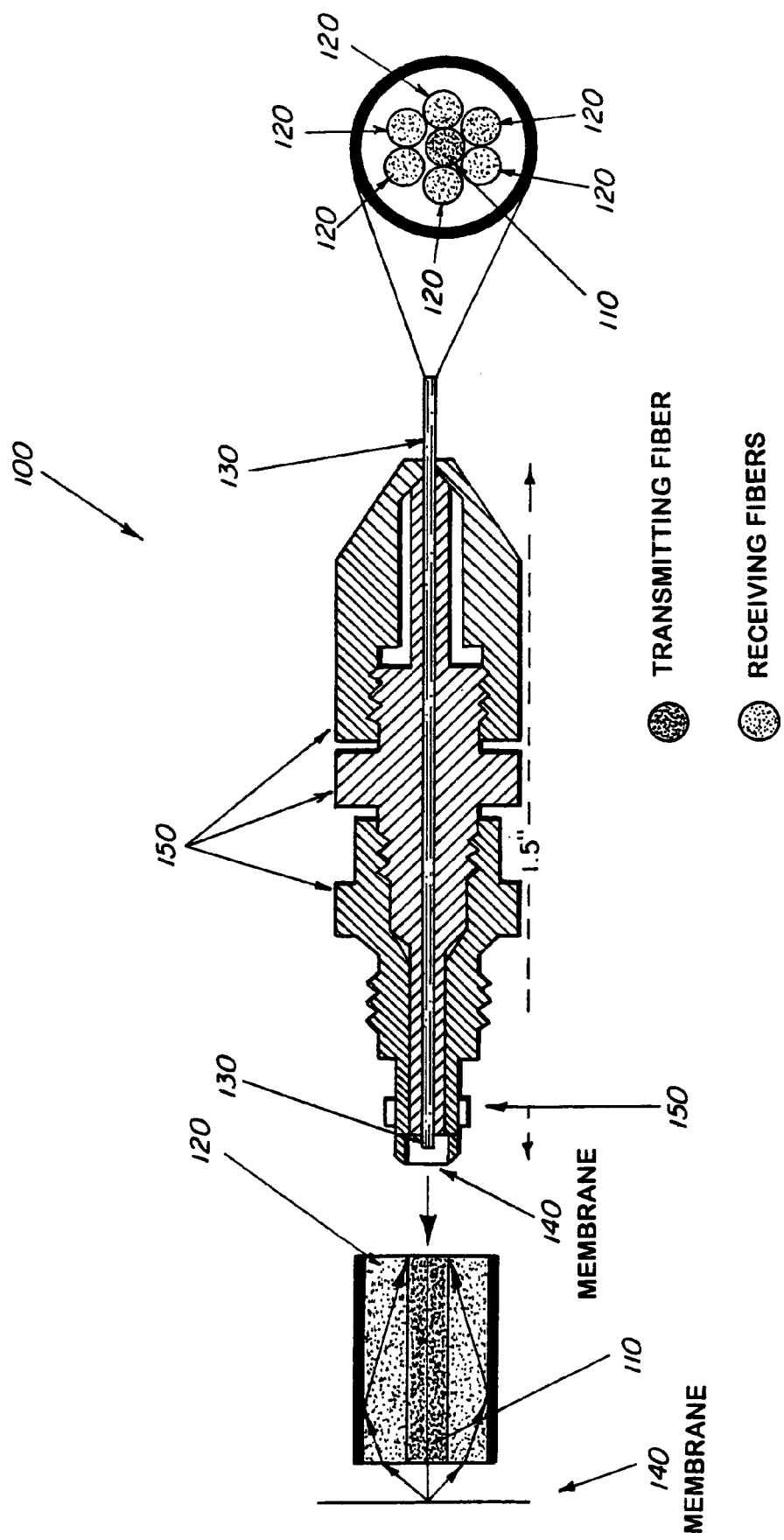
FIG. 1 shows an example embodiment of a fiber optic pressure sensor.

Referring now to the figures where like numbers denote like elements, FIG. 1 shows an example embodiment of a fiber optic pressure sensor.

FIG. 1 shows a fiber optic pressure sensor featuring a cartridge housing 150 having an end that is exposed to the atmosphere, a thin flexible membrane 140 covering the exposed end of the cartridge housing 150 such that the flexible membrane has an exposed side and a protected side. A fiber bundle 130 is disposed within the cartridge housing, featuring a transmitting fiber 110 having a first and second ends. The first end has a polished finish and the second end is coupled to a light source (not shown). The fiber bundle 130 also features a multitude of receiving fibers 120 disposed around the transmitting fiber 110 with each receiving fiber 120 having first and second ends where the first ends are also polished. The fiber bundle 130 is disposed within the cartridge housing 150 such that the first end of the transmitting fiber 110 and the first end of each receiving fiber 120 is adjacent to the protected side of the flexible membrane 140 with free space between the first fiber end and the protected side of the flexible membrane. A light sensing means (not shown) is coupled to second end of said receiving fibers wherein light launched into the transmitting fiber 110 propagates through the transmitting fiber, emerges at the polished end, propagates a very short distance in air, and is reflected by the flexible membrane 140 into the receiving fibers 120, propagates through the receiving fibers, and is detected by light sensing means (not shown).

Upon a change in the atmospheric pressure, pressure waves cause the flexible membrane 140 to distort causing a change in the amount of light reflected by the protected side of the flexible membrane into the receiving fibers 120. Thus the intensity of the light coupled into the receiving fibers 120 modulates in relation to the intensity of pressure wave causing the flexible membrane 140 to distort. These pressure waves can be the result of a change in the environment such as a sound, if the sensor is configure to operate as a microphone. Other modes for the pressure sensor are also possible such as an altimeter mode that senses a change in atmospheric pressure, motion sensor or etc. Other sensor modes based on an event that results in a pressure wave are also possible.

The type of fiber employed in the example embodiment shown in FIG. 1, is generally a multimode fiber having a core that is preferably made of glass. The cladding may be plastic or some other material. In a preferred embodiment fibers with a high numerical aperture are used. Generally fibers with a numerical aperture of >0.2 are employed. A high numerical aperture provides for greater efficiency in the coupling and transmission of light. Fibers featuring high numerical apertures are not required, however. When employed in systems that have a great distance between the source and membrane a fiber having a high numerical aperture is not critical.

Generally multimode fibers with a combination of a thick core and thin clad fiber are preferred. Light incident on clad is lost, thus the core needs to be as close in proximity to the outer perimeter of the clad as possible to ensure efficient light coupling in the core. Thus light coupling within the fiber is maximized with a thick core thin clad structure. This however, does not limit the use of fibers in this device to multimode fibers with thick core thin cladding structures. Varying degrees of effectiveness and light coupling are possible with other fiber configurations.

The fiber optic pressure sensor's cartridge housing is constructed of a rigid and lightweight material. A rigid structure provides the sensor with a robust design. Another advantage to the rigid structure is that the sensor is very resistant to vibration, G forces and other structural forces with could impact sensor performance.

The cartridge housing features means to adjust the distance between the polished end of the transmitting fiber and the flexible membrane. In the preferred embodiment the system employs a screw type configuration, with a locking nut and an adhesive material applied to the nut to maintain a consistent distance. This configuration also provides the user the ability to adjust the distance from the fiber bundle to the flexible membrane by very small increments, and to lock or otherwise maintain a consistent distance in a dynamic environment.

While other attachment and adjustment methods may be applied to the sensor as an adjustment means, to extract optimum performance from the sensor the mechanism must be resistant to vibration and temperature variations. If the distance from the fiber bundle to the membrane is not maintained precisely, the accuracy and sensitivity of the sensor package will suffer.

The cartridge housing features means to adjust the tension of the flexible membrane drawn across the exposed end of the cartridge housing. This may be accomplished via a screw type adjustment or some other means of adjustment.

The flexible membrane also features a coating on the protected side to enhance its light reflecting properties. In a preferred embodiment the flexible membrane is constructed of mylar and features at least one surface coated with thin aluminum film. The aluminum film increases the light reflecting properties of the flexible membrane, however other coatings may be applied to increase the membrane's sensitivity, or toughness.

The fiber optic pressure sensor fiber bundle features a single multimode transmitting fiber and a multitude of receiving fibers all encased in a protective tubing. In the example embodiment shown in FIG. 1 the protective tubing is a stainless steel tubing, yet other type of tubing may be used to encase the fiber bundle. One will appreciate that the type of tubing, if any, that is used to encase the fiber bundle is not limiting to this invention.

The light sensing means is at least one silicon PIN diode. LEDs represent a very efficient way to launch light into the fiber. LED are generally low cost and feature low noise operation in a fiber system. LEDs are also tend to be very stable over extended periods of time. Laser diodes are also applicable, although they increase the expense and complexity of the system. Current laser diodes, also tend to introduce additional noise to the sensor package. One suitable LED for use as a light source is an Optek OPF370A LED emitting light at 850 nm.

In another embodiment of the fiber optic pressure sensor the fiber optic pressure sensor features a cartridge housing having an end that is exposed to the atmosphere, a thin flexible membrane covering the exposed end of the cartridge housing such that the flexible membrane has an exposed side and a protected side. A fiber bundle is disposed within the cartridge housing, featuring a transmitting fiber having a first and second ends.

The first end has a polished finish and the second end is coupled to a light source.

The fiber bundle also features a receiving fiber disposed adjacent to the transmitting fiber. The receiving fiber has a first and second end where the first end is also polished. The fiber bundle is disposed within the cartridge housing such that the first end of the transmitting fiber and the first end of the receiving fiber is adjacent to the protected side of the flexible membrane with free space between the first fiber end and the protected side of the flexible membrane. A light sensing means is coupled to second end of the receiving fiber wherein light launched into the transmitting fiber propagates emerges at the polished end, propagates a very short distance in air, and is reflected by the flexible membrane into the receiving fiber, propagates through the receiving fiber, and is detected by light sensing means. Upon a change in the atmospheric pressure, pressure waves cause the flexible membrane to distort causing a change in the amount of light reflected by the protected side of the flexible membrane into the receiving fiber. Thus the intensity of the light coupled into the sensing fiber modulates in relation to the intensity of pressure wave causing the flexible membrane to distort.

Figure 2:
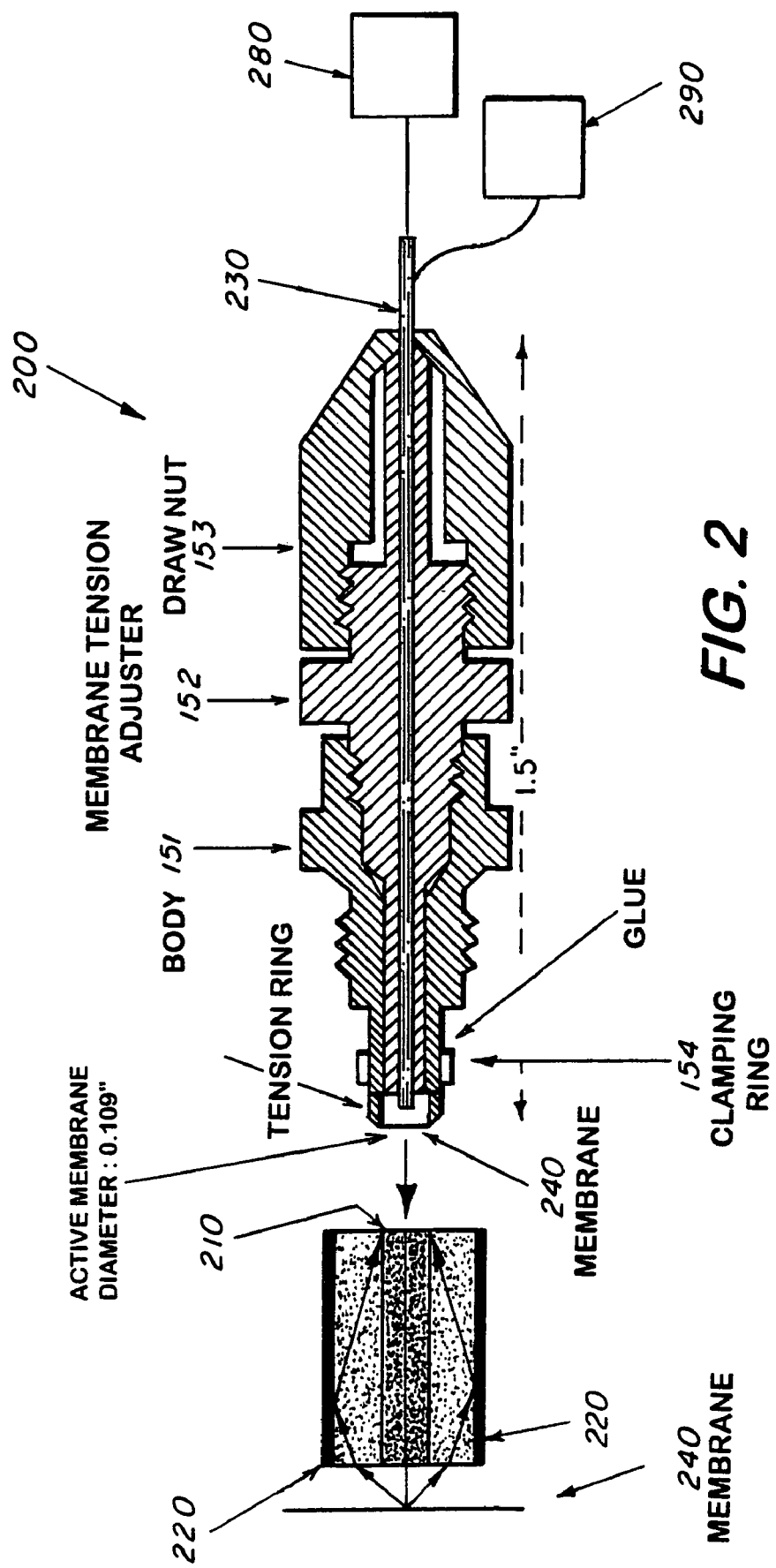
FIG. 2 shows an example embodiment of a fiber optic pressure sensor used as a microphone.

FIG. 2 show an exemplar of a pressure sensor having the structure as described above, employed as a microphone. The device uses an LED emitting at 850 nm as the light source 280 with a silicon PIN diode as the light sensing means 290. The fiber bundle 230 disposed within the cartridge housing, comprises six multimode receiving fibers 220 surrounding a single multimode transmitting fiber 210. The cartridge housing 150 is formed with screw type adjustments for fiber to membrane distance 153 and for membrane tension 152, and a clamping ring 154 also for setting and maintaining the membrane tension. The fiber bundle 230 is housed within a plastic cartridge made from Noryl. The weight of the sensor is 1.3 grams. The first end has a highly polished finish and the second end of the transmitting fiber is coupled to the light source. The second ends of the receiving fibers are coupled to the light sensing means while the first ends also feature a highly polished finished. The optical fiber features a 200 μm glass core, and 230 μm plastic clad, a 500 μm Tefzel plastic coating, and a numerical aperture of approximately 0.37. The plastic coating is removed. A suitable stripper for removing the plastic coating has an approximately 305 μm blade hole. The seven fiber bundle is inserted into a stainless steel tube with 1.270 mm outer diameter and 838 μm inner diameter, so the fiber bundle is contained within the tube, forming a probe.

Epoxy is applied to the seven fibers so the fibers form a symmetric bundle close to the tubing end with the transmitting fiber at the center and cured. After curing, the fiber bundle can be cut close to the tubing end and the probe end can be polished. The probe, which includes the bundle and the protecting stainless steel tube, is housed within the plastic cartridge housing. The fiber bundle 230 is disposed within the cartridge housing 150 such that the first end of the transmitting fiber and the first end of each receiving fiber is adjacent to the protected side of the flexible membrane 240 with free space between the first fiber end and the protected side of the flexible membrane. The flexible membrane 240 is a 1.27× 10-3 cm mylar (polyester) layer, having one surface that is coated with a thin aluminum film. The tension on the mylar membrane is adjusted to achieve the desired acoustic bandwidth. The membrane probe separation is also adjusted to achieve the desired bandwidth sensitivity. A somewhat broad dynamic sensitivity maximum was found for a probe—membrane separation between 180 and 250 μm.

Upon a change in the atmospheric pressure, pressure waves cause the flexible membrane to distort causing a change in the amount of light reflected by the protected side of the flexible membrane into the receiving fibers. Thus the intensity of the light coupled into the receiving fibers modulates in relation to the intensity of pressure wave causing the flexible membrane to distort.

In yet another embodiment a single fiber may be used as the transmitting and receiving fiber. In this embodiment the light source and the means for sensing the received light are both coupled to the fiber end. The light is launched from the fiber into the flexible membrane and is reflected back into the same fiber.

In the single fiber embodiment, it is suitable to use a multimode optical fiber with a 200 μm glass core, and 230 μm plastic clad, a 500 μm Tefzel plastic coating, and a numerical aperture of approximately 0.37. The probe housing is a stainless steel tube of 902 μm outer diameter and 584 μm inner diameter. To form the probe, the fiber is inserted in the tubing with its coating and epoxy is applied on the fiber. After the epoxy has cured, the fiber is cut closely to the tubing and the end of the fiber is polished well. A 50/50 (at 850 nm), low loss, optical coupler, such as one manufactured by Gould Electronics, can be used in the one fiber probe.

Figure 3:
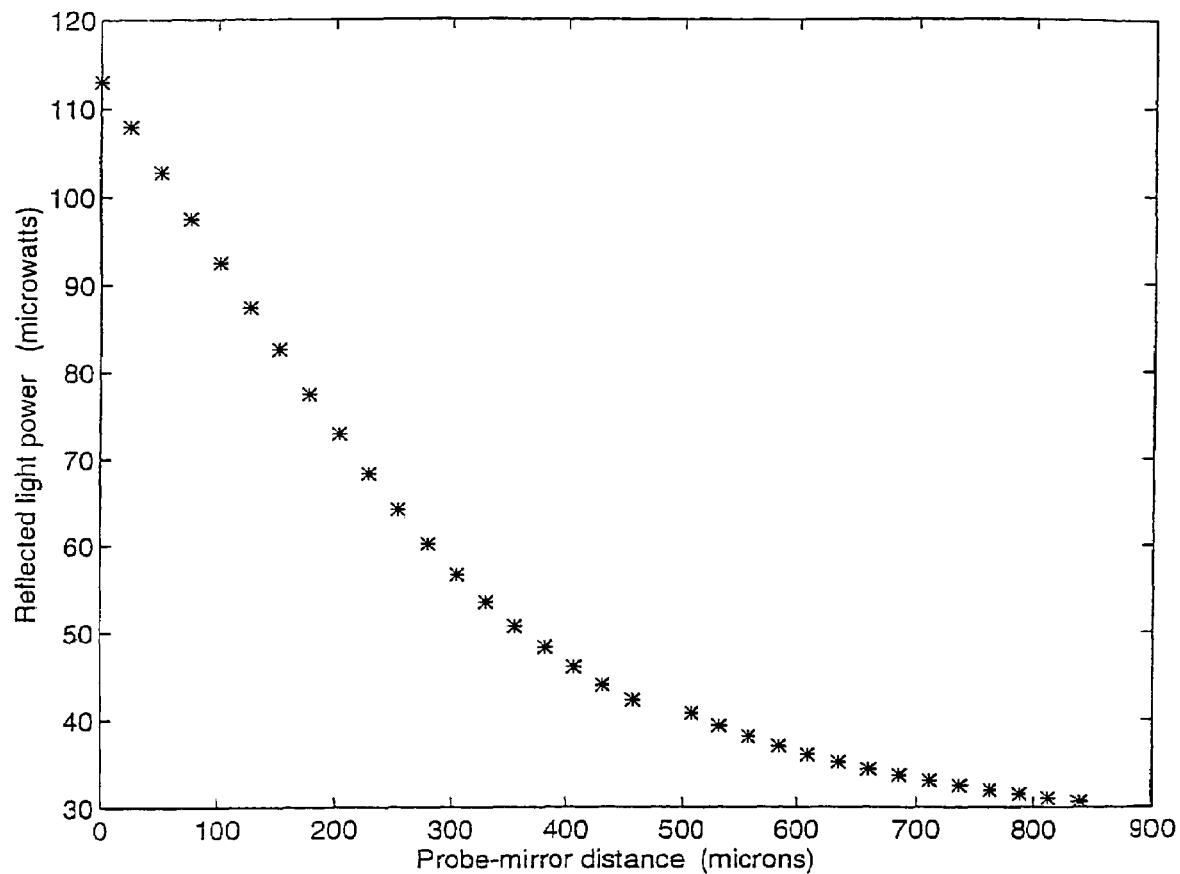
FIG. 3 illustrates the dc displacement sensitivity of a one-fiber probe pressure sensor versus the probe end to mirror distance.

FIG. 3 illustrates the displacement sensitivity of the one-fiber probe. The displacement sensitivity of the one fiber probe can be studied by mounting it on a micrometer translator which can be displaced manually against a mirror mounted on a piezoelectric transducer (PZT4 cylinder of 2 inch outer diameter and 3 inch length) which can be vibrated electrically. The probe is displaced manually against the mirror in steps of 25.4 μm using a micrometer translator. Results are shown in FIG. 3 where the power of the reflected light coupled into the same fiber is plotted vs. the probe—mirror distance. As can be seen from this figure, maximum displacement sensitivity is achieved in the 0-150 μm probe—mirror distance.

Figure 4:
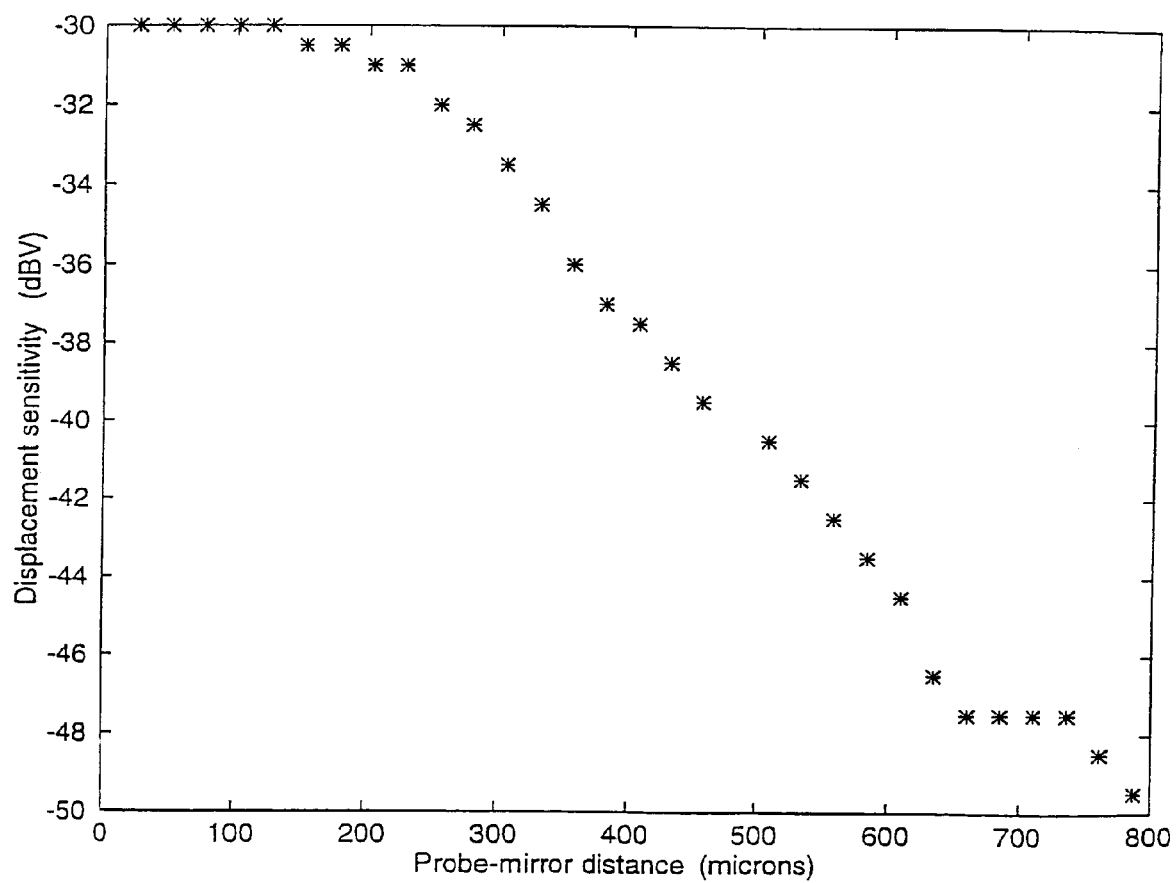
FIG. 4 illustrates the ac displacement sensitivity of a one-fiber probe pressure sensor versus the probe end to mirror distance.

The one fiber probe can also be dynamically displaced against the mirror by vibrating the PZT transducer electrically. The displacement amplitude of the vibrating mirror can be obtained from the output of a small reference accelerometer (for example, the Endevco 2250A) mounted close to the mirror. Results are shown in FIG. 4, which shows the ac displacement sensitivity as a function of the probe—mirror distance. As can be seen from this figure, the sensitivity is maximum and approximately constant in the 0-150 μm region, in agreement with the dc displacement results of FIG. 3. These results illustrate that an optimum operating distance of the 1 fiber probe end from the reflecting surface is about 60 μm and the optimum operating region is 0-120 μm, for this type of transmitting fiber, although other operating distances can be used.

Figure 5:
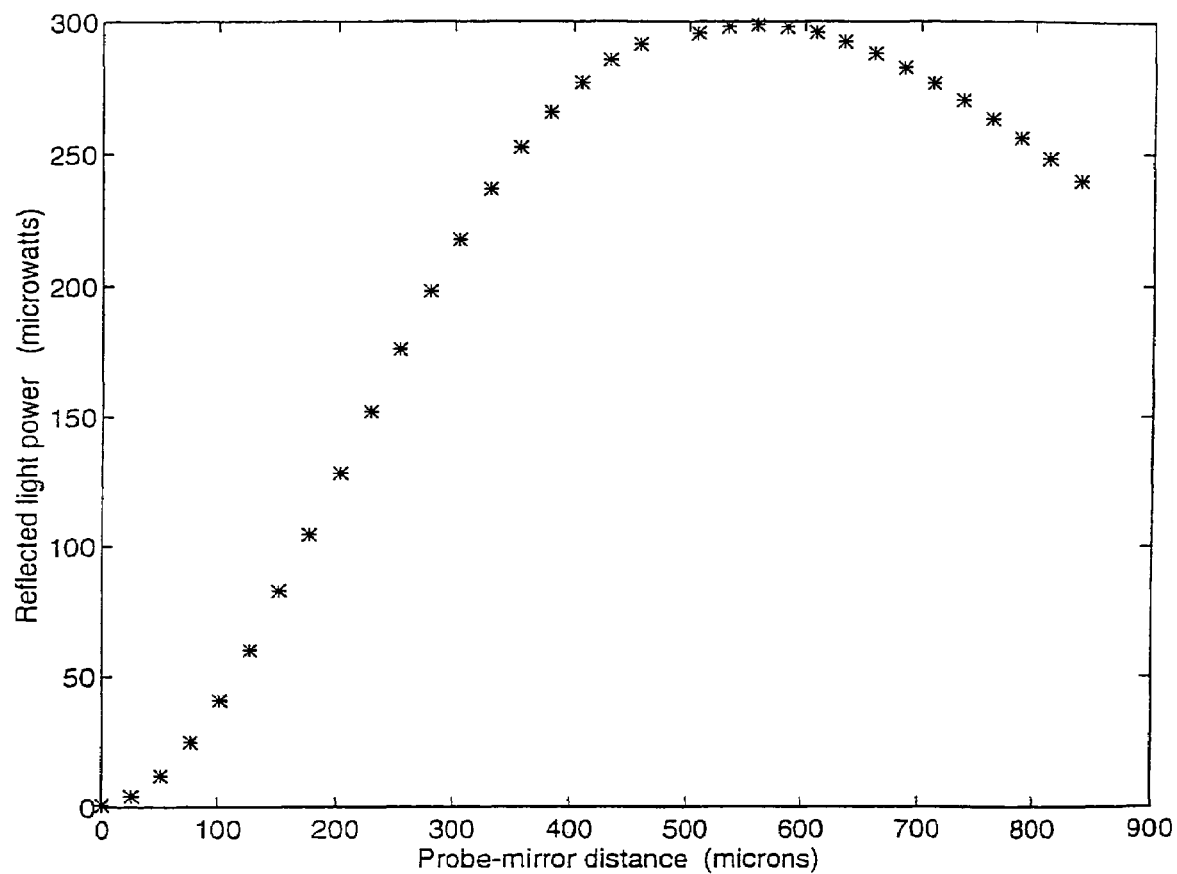
FIG. 5 illustrates the dc displacement sensitivity of a seven fiber probe pressure sensor versus the probe end to mirror distance.

FIG. 5 illustrates the dc displacement sensitivity of the 7 fiber probe, which was studied in a similar way to that of the one—fiber probe. In FIG. 5, the reflected light power coupled into the 6 receiving fibers is plotted vs. the probe—mirror distance. The maximum displacement sensitivity is achieved for a probe—mirror distance of about 180-250 μm and is about 9.38×10−11 W/A, where A is equal to 10−8 cm. By comparing the results in FIGS. 3 and 5, it is seen that the region of maximum sensitivity of the seven fiber probe is different than that of the 1 fiber probe. For example, the maximum sensitivity region for the one fiber probe is found at close to zero probe-mirror distance, while the maximum sensitivity region for the seven fiber probe, the maximum sensitivity is achieved at a greater distance. Another difference is that with the seven fiber probe, significantly higher light power is detected. This is believed to be due primarily to the coupler used in the one fiber probe which reduces the power by at least about 50%.

Figure 6:
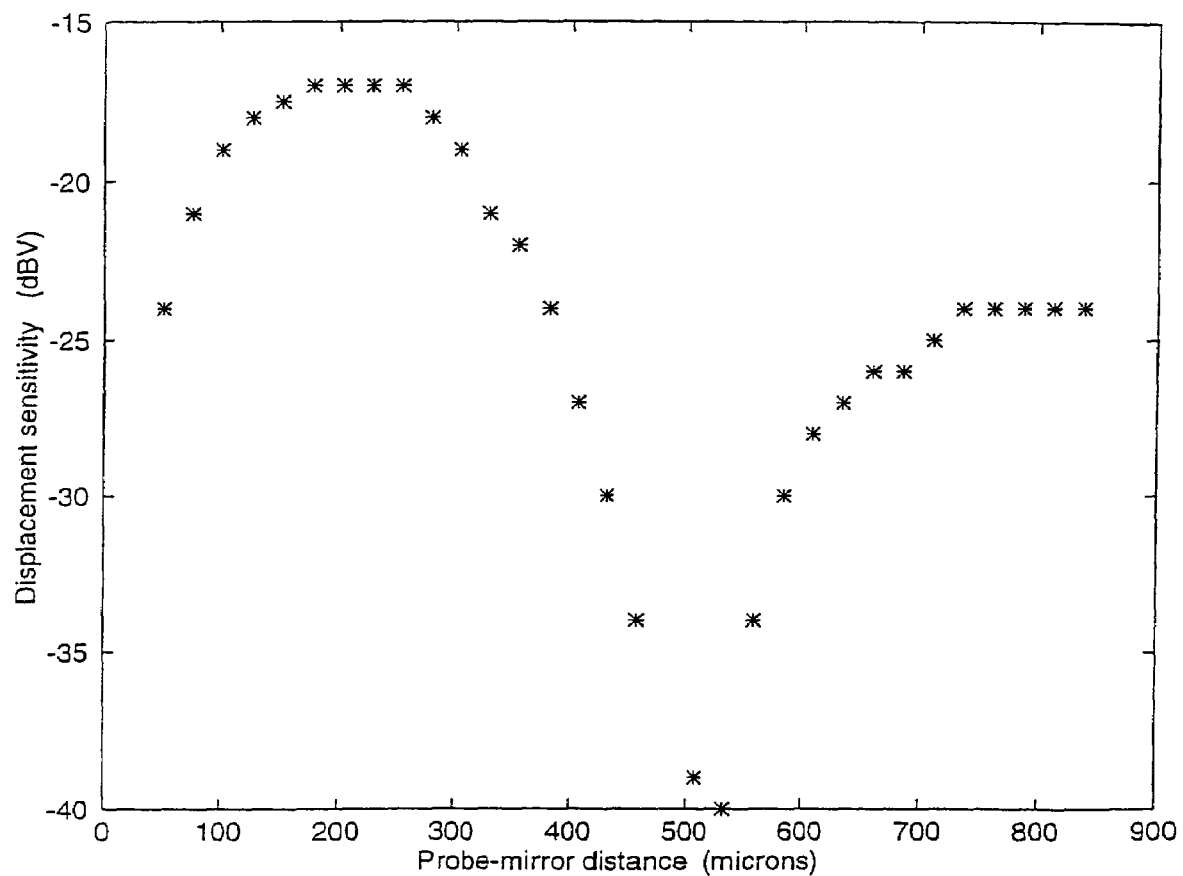
FIG. 6 illustrates the ac displacement sensitivity of a seven fiber probe pressure sensor versus the probe end to mirror distance.

FIG. 6 illustrates the displacement sensitivity plotted as a function of the probe mirror distance for the seven-fiber probe. These results were obtained in a similar way as the FIG. 4 results for the one-fiber probe. As can be seen from this figure, maximum displacement sensitivity is achieved in the probe—mirror distance range of 180-250 µm, in agreement with the dc displacement results of FIG. 5. This maximum displacement sensitivity range indicates that an optimum probe—reflecting surface distance can be about 220 µm. From FIGS. 6 and 4, it is apparent that the the maximum ac displacement sensitivity of the seven fiber probe is about 13 dB higher than that of the one fiber probe. Thus, the increased sensitivity difference and the high cost of the multimode coupler used in the one fiber probe make a seven-fiber probe sensor better for some applications than a one fiber probe sensor, even though the one fiber probe sensor uses only one fiber instead of seven. In other applications, for example, in remote sensing applications in which longer fiber lengths are needed, a one-fiber probe sensor can be a better choice.

Based on the results shown in FIG. 6, the displacement sensitivity of the 7 fiber probe was calculated from the signals of the probe and the reference accelerometer and was found to be equal to 6.35×10−11 W/A. This result is slightly less than the 9.35×10−11 W/A sensitivity calculated from the dc displacement procedure, the results of which are shown in FIG. 5. Typically, a good PIN detector can detect a fraction of a picowatt ac signal, the minimum detectable displacement limited by the detector noise is: minimum detectable displacement $\geq$0.01 A.

Pressure can be detected by replacing the mirror used in the fiber probe with a reflecting surface such as a reflecting membrane. The membrane used in a one or seven fiber pressure sensor such as the one shown in FIGS. 1 and 2 can be a 12.7 µm mylar film whose surface is metallized with a thin aluminum coating. The reflecting membrane can be placed at an optimum distance from the probe end for maximum sensitivity and the membrane's tension can be set to an optimum tension for achieving the desired microwave bandwidth.

The cartridge provides mechanisms for applying the desired membrane tension and for clamping the probe in place at the optimum membrane-probe end distance. The optimum membrane-probe end distance can be found in practice by adjusting the distance, monitoring the detected light from the receiving fibers, and taking into account the FIG. 5 and FIG. 6 calibration for the seven fiber probe. Similarly, FIGS. 3 and 4 can be used to determine the optimum membrane-probe end distance for a one-fiber probe.

Figure 7:
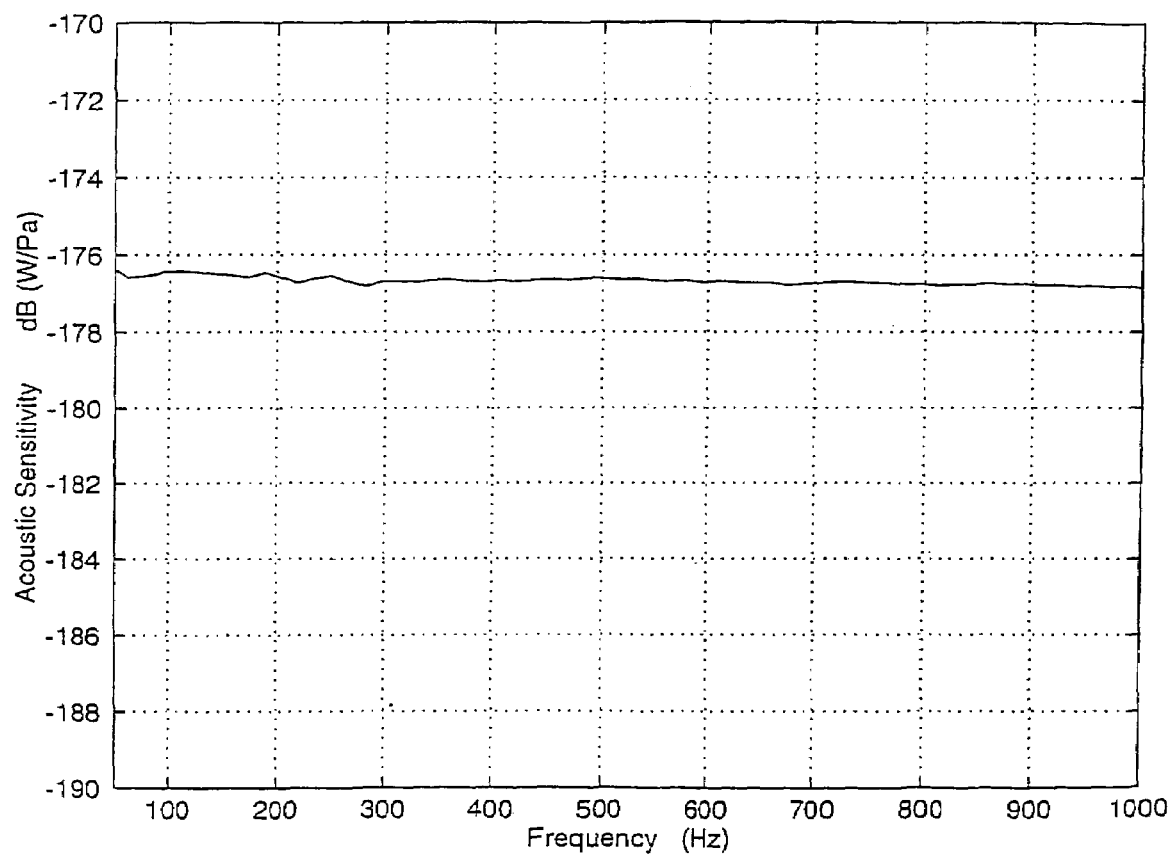
FIG. 7 illustrates the acoustic sensitivity of a seven fiber probe pressure sensor in the frequency range 10-1000 Hz.

The pressure response of the seven fiber probe microphone illustrated in FIGS. 1 and 2 can be found by placing it in a high pressure microphone calibrator, for example, type 4221 Bruen & Kjaer (B&K). A reference microphone, for example, a ¼" pressure field 4938 B&K microphone, with a 2669 B&K preamplifier and a 2690 B&K amplifier can be used. A pulse is applied on the pressure calibrator and the output signals of the fiber and the 4938 microphones are recorded and stored in a Macintosh computer using a ML750/M PowerLab recorder. About 1 mW light power is coupled into the transmitting fiber from the LED which is driven at 100 mA. The detector is a PIN silicon detector, model PDA 55 made by Thorlabs. Results are shown in FIG. 7, in which the acoustic sensitivity of the fiber microphone is plotted in the frequency range of 50-1000 Hz. As can be seen from this figure, the frequency response of the acoustic sensitivity of the fiber optic microphone is frequency independent in this frequency range, with the probe exhibiting about the same sensitivity over a range of 0.2 Hz to 1 kHz. The frequency response of the fiber optic microphone was studied also at frequencies much higher than 1 kHz and was found to be frequency independent. As can be seen from FIG. 7, the pressure sensitivity of the 7 fiber probe microphone is: Acoustic sensitivity=1.5×10−9 W/Pa.

The noise equivalent power (NEP) of a good detector is approximately 0.17 pW/Hz$^{1/2}$ (e.g., the EG&G model HUV-1100 PIN detector with a preamplifier), which corresponds to a minimum detectable pressure of 41 dB re 1 µPa/Hz$^{1/2}$. Typically, however, noise from other sources can limit the minimum detectable pressure, so the minimum detectable pressure will be higher than 41 dB it would be higher than 41 dB re 1 µPa/Hz$^{1/2}$.

In the above-mentioned experiment, the light source is the OPF 370A Optek LED driven by a LD-3620 Lightwave Technology Power supply and the detector is a PDA 55 PhorLabs PIN whose output is stored directly into 3582A HP spectrum analyzer. The minimum detected pressure for this arrangement was found to be 84 dB re 1 µPa/Hz$^{1/2}$.

FIG. 8 illustrates the main characteristics of the exemplary seven fiber microphone described herein compared to commercially available microphones, the 4938 B&K and the 130A10 Modal Shop. The fiber microphone linearity results are comparable to the 4938 B&K microphone and better than the 130A10 Modal Shop microphone. The acceleration sensitivity of the fiber microphone, which was found to be higher than that of the other two microphones, is believed to be due primarily to the lead noise. The diaphragm diameter is less than ⅛ inch in the fiber microphone compared to ¼ inches in the comparison microphones. An increase of this diameter affects the bandwidth and minimum detectable pressure, as discussed further herein. The size, weight, cost, and electrical requirements of the fiber microphone are lower than that of the comparison microphones. Note that the comparison microphones require a preamplifier to minimize EMI. The dynamic range of the pressure sensor is higher than 60 dB and its linearity is 1%. The acceleration sensitivity, which can introduce significant noise in a dynamic environment, was studied by mounting the pressure sensor on a piezoelectric shaker. The sensor was vibrated along the fiber—probe axis and perpendicularly to it. The axial and transverse acceleration sensitivities of the sensor were found to be 3 Pa/g and 1 Pa/g, respectively.

The minimum detectable pressure and bandwidth of a microphone with a diagragm can be determined by the following equations, in which T is the tension, ρm is the density, and r is the radius of the diaphragm:

For conventional microphones such as the 4938 B&K: $x/p=r^2/(4T)$, where x is the displacement of the diaphragm generated by an applied pressure p.

For the fiber microphone: $x/p=r^2/(8T)$.

By comparing these equations, it is apparent that the sensitivity of the fiber microphone is twice as high as that of conventional microphones. Further, the microphone sensitivity is directly proportional to the radius squared. Thus, the minimum detectable pressures for the fiber microphone and the 4938 microphone are expected to be about the same for diaphragms of the same radius. The microphone sensitivity is also inversely proportional to the diaphragm tension. On the other hand, the first resonance of the microphone, which determines the microphone bandwidth, is inversely proportional to the radius and proportional to the square root of the tension:

$$f_R = (2.4/(2\pi r))*(T/(\rho_m t))^{1/2}.$$

In general, the radius and tension of the diaphragm can be chosen to satisfy the required minimum detection pressure, bandwidth, and size of the microphone.

As discussed in the previous paragraphs, the pressure sensors described herein and illustrated in FIGS. 1 and 2 are suitable for sensing dynamic pressure changes and for use as microphones. These pressure sensors are also suitable for static pressure sensing.

FIG. 9A illustrates a fiber optic probe 910 having a centrally arranged transmitting fiber 912 surrounded by six receiving fibers 914. Static pressure p is applied to the flexible membrane 916. FIG. 9B illustrates a multi-fiber optic pressure sensor 910 in accordance with FIG. 1 or 2 operating in a test set up to demonstrate measurement of static pressure p. The fiber optic probe 910 is placed in a closed end of a liquid-filled U-tube manometer 920, with an opposite end 924 of the U-tube manometer open to the atmosphere. The probe 910 is subjected to a pressure corresponding to the height difference h between the levels of the two liquid columns 926 and 928, with h being proportional to the pressure p relative to the atmospheric pressure at the open end of the tube 924 and to the density $\rho$ of the fluid in the manometer 920 according to the equation $p=\rho gh$.

Figure 10:
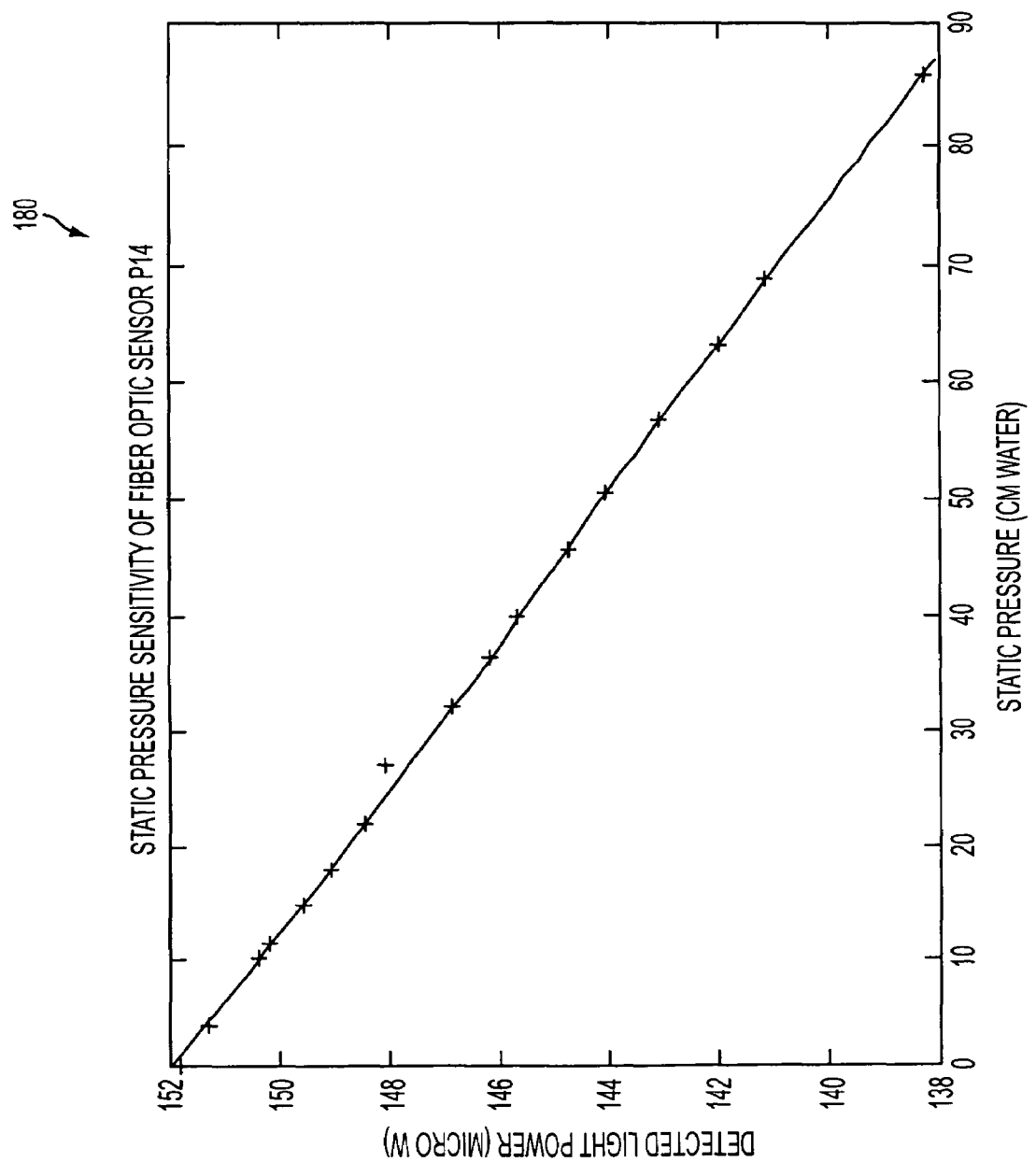
FIG. 10 illustrates the results of measuring static pressure using the fiber optic pressure sensor illustrated in FIG. 1 or 2.

An optical source 950 such as a light emitting diode is coupled to a transmitting fiber 960 through connectors 952 and 953. Light generated by the optical source is transmitted through the connectors, through a length of optical fiber, through another pair of connectors 954 and 955 and into the probe 910, where it travels from the polished end of the transmitting fiber 912 a short distance to the flexible membrane 916 illustrated in FIG. 9C. The light is reflected by the membrane 916 toward the receiving fibers 914 that are arranged around the transmitting fiber 912. A portion of the reflected light is received by the one or more receiving fibers 914, and is transmitted through the receiving fibers via connectors 956 and 957, a length of optical fiber 980, through another pair of connectors 958 and 959, and into a power meter 970. The intensity of the light received by the power meter 970 corresponds to the static pressure p to which the sensor 910 is subjected. FIG. 10 is a graph 180 illustrating the results of measuring static pressure in the arrangement of FIG. 9A-9C. As seen in FIG. 10, the detected light power in microwatts is linearly related to the static pressure in centimeters water. The sensitivity of the sensor of FIG. 1 as tested in the arrangement of FIG. 9A-9C is 10 microwatts divided by 68.4 cm water, or approximately $1.6 \times 10^{-9}$ Watts/Pascal. The same sensor is estimated to have a dynamic sensitivity of $1.53 \times 10^{-9}$ W/Pa. By dividing the static pressure (6.7 kPa) by the minimum detectable pressure (1.6 mPa/Hz$^{1/2}$), the dynamic range is found to be at least $4 \times 10^5$. The sensor has a variation of 0.0004 inches of water over a measurement period of about 4 hours. In tests, the measurement resolution is at least 0.001 inches of water using the pressure sensor 910 at a light level of 150 µW, and about 0.0005 inches of water with a lower light level of 50 µW.

The sensor 910, together with a light source and a receiver, can be used to measure static pressure in any desired location and is not limited to the arrangement illustrated in FIG. 9B. For example, the pressure sensor can be placed at locations within the human body to measure pressure.

Figure 11:
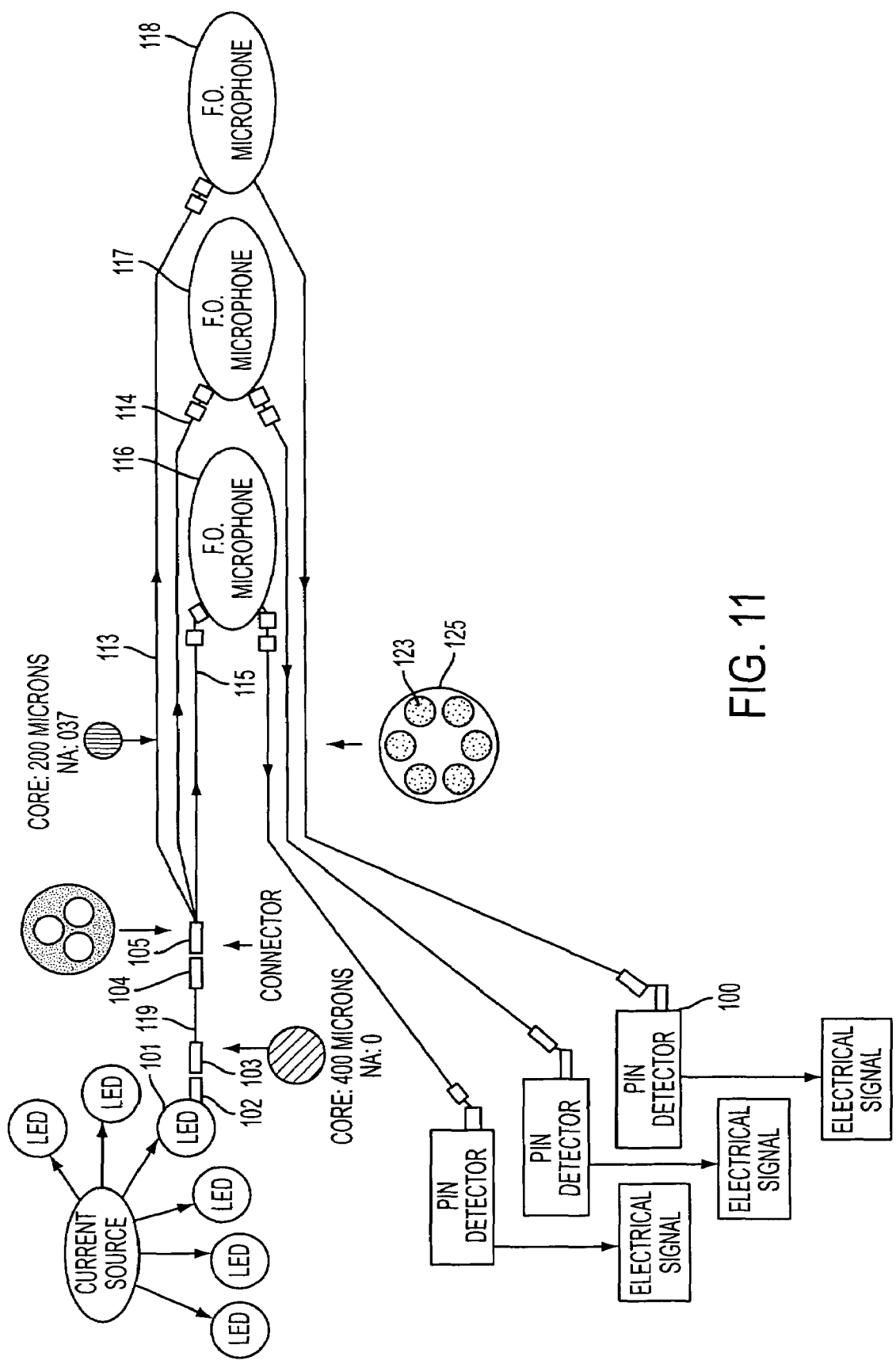
FIG. 11 illustrates a sensor system in accordance with an embodiment of the invention.

FIG. 11 illustrates a fiber optic sensor system arranged to measure environmental characteristics at several locations and/or take different kinds of measurements at the same location. Each LED 101 is coupled to a length of large diameter optical fiber 119 through a pair connectors 102, 103. Smaller diameter optical fibers 113, 114, and 115 can be arranged to receive light from the large diameter optical fiber 119. Another connector pair 104, 105 couples the larger diameter optical fiber 119 to multiple smaller diameter optical fibers. In this example, the larger diameter optical fiber is 400 microns in diameter and the three 200 micron core diameter optical fibers 113, 114, and 115 are arranged to receive equal amounts of light from the larger diameter optical fiber 119. Although various connectors can be used, it is preferred that the connectors maintain the smaller optical fiber with a large part of its core area abutting the core of the larger diameter fiber. More or fewer than three optical fibers can be used to receive light from the larger diameter optical fiber 119.

A large diameter optical fiber 119 with a 400 micron core and a 0.37 numerical aperture can efficiently provide light into three 200 micron core diameter, 0.37 numerical aperture fibers 113, 114, and 115. If the optical fiber 119 has a core diameter of 600 microns and a numerical aperture of 0.37, six of the 200 micron core diameter fibers can be efficiently supplied with light, allowing each LED to supply light to 6 transmitting fibers, and allowing each current source to power 36 sensors at a low cost.

Note that while the LEDs can each provide light to several 200 micron transmitting fibers directly without an intermediate larger diameter fiber 119, this can result in a large variation in light into the fibers. For example, an LED providing light directly to three 200 micron core diameter, 0.37 NA fibers can result in a variation of light intensity of up to 300%. Arranging the larger diameter optical fiber 119 between the LED and the smaller diameter transmitting fibers couples the light more uniformly into the transmitting fibers, and can reduce the variation between light intensities in the transmitting fibers to less than 10%. The larger diameter optical fiber 119 illustrated in FIG. 11A-11E is about six inches in length, and however, can be longer or shorter.

Each of the optical fibers 113, 114, and 115 extends to a different sensor 116, 117, and 118 and is connected to the transmitting optical fiber for that sensor.

Receiving fibers of the sensors 116, 117, and 118 receive the reflected light, as discussed in previous paragraphs related to FIGS. 1, 2, and 9A-9C. The receiving fibers can transmit the light directly to the photodetectors, or can be coupled to lengths of fiber via connector pairs for transmission to the photodetectors. The photodetectors convert the received light from the fiber optic sensors to electrical signals.

The sensors 116, 117, and 118 can each be a 7 fiber pressure sensor as shown in FIG. 1 or 9A-9C. Alternatively, the sensors could be a pressure sensors with a different number of fibers, strain sensors, temperature sensors, or other fiber-optic based environmental sensors.

For each sensor, the receiving fibers can be abutingly connected to a larger diameter optical fiber, with the larger diameter optical fiber being large enough to receive light from all the six receiving fibers. For example, a 600 micron core diameter fiber 125 can be arranged to couple the light in the six receiving 200 micron core diameter fibers 123 into a PIN detector 126.

The following list identifies suitable components are suitable for the sensors and sensor devices, although it will be recognized that many other components may also be used. One suitable current source is manufactured by Wavelength Electronics, model no. LDD200-1M. LEDs can be the OPF370A models at 100 mA supplied by Optek. Suitable 200 micron core diameter fiber is manufactured by OFS, headquartered in Norcross, Ga., USA, and is identified by model number CF01493-10. Suitable 400 micron core diameter fiber is manufactured by OFS, identified as model number CF01493-12. Suitable 600 micron core diameter fiber is manufactured by OFS, identified as model number CF01493-14. A suitable PIN detector is manufactured by Advanced Photonics, headquartered at Camarillo, Calif., USA, and identified by model number SD 100-41-21-231. Suitable fiber, PIN, and LED connectors are available from Fiber Instrument Sales (FIS), headquartered in Oriskany, N.Y., USA, and identified by model numbers #F1-0061830 and #5014741. Connectors can be modified if necessary to accommodate the larger diameter optical fibers and the multiple smaller diameter fibers to be connected.

Figure 12:
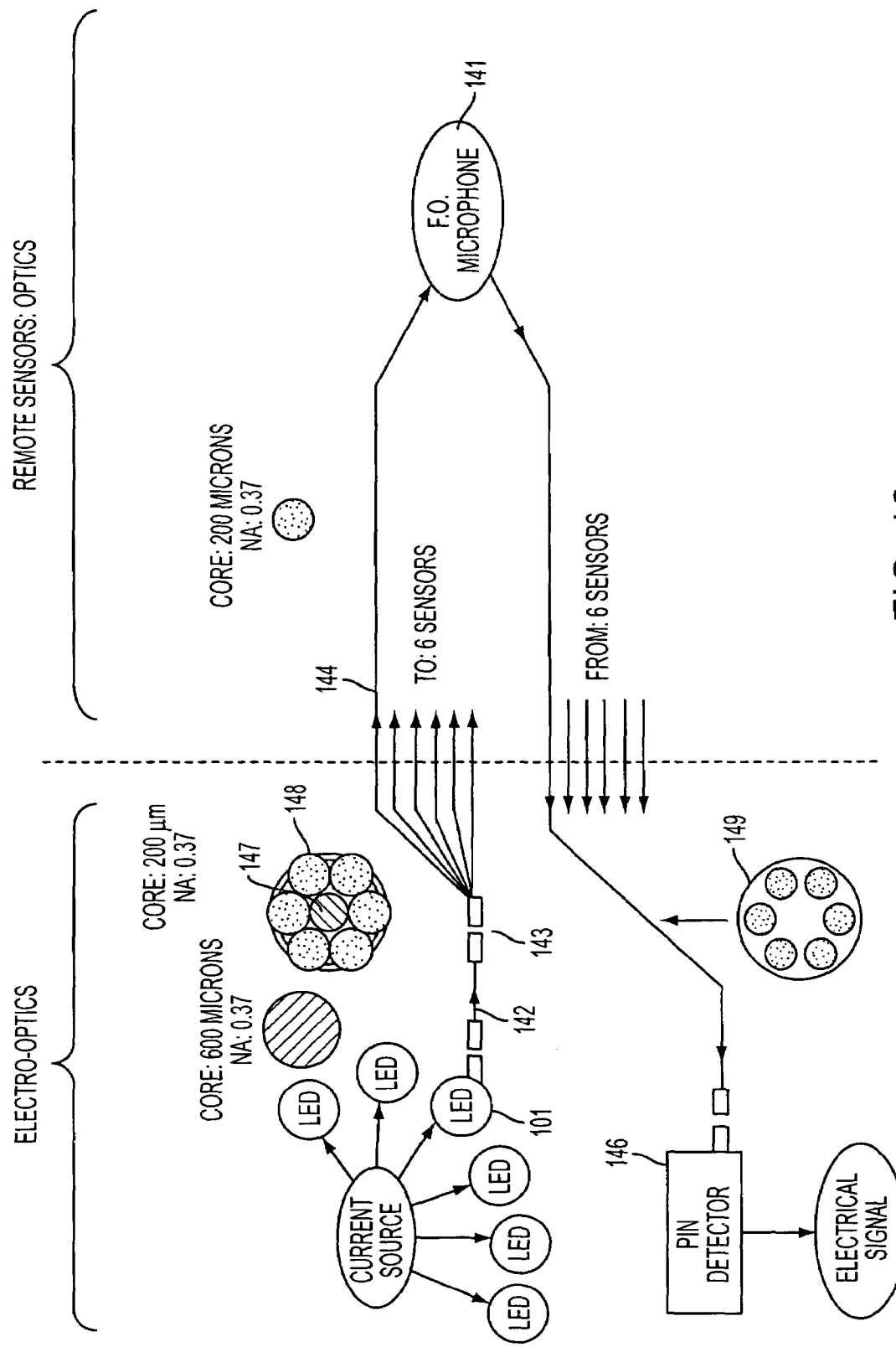
FIG. 12 illustrates a sensor system in accordance with another embodiment of the invention.

FIG. 12 illustrates a multiplexed sensor system with each current source supplying six LEDs 101, and each LED supplying light to six sensors 141. For each LED, a larger diameter fiber 142 is arranged to receive light from the LED via a connector pair. A connection is arranged at the end of the larger diameter optical fiber 142 to couple light into six smaller diameter fibers 144. In this example, the larger diameter fiber 142 has a core diameter of 600 microns, and the smaller diameter fibers 144 have core diameters of 200 microns, all with numerical apertures of NA=0.37.

Each smaller diameter fiber 144 transmits the light D to an individual sensor 141, in this example, a fiber optic microphone. In this example, each LED supplies light to six sensors via the six smaller diameter fibers receiving light from the larger diameter fiber.

The sensors 141 can be the seven fiber pressure sensor illustrated in FIG. 1, or any other desired optical fiber based sensor. In this example, six receiving fibers in the sensors 141 transmit light via connectors and a length of larger diameter optical fiber 149 to photodetectors 146.

The multiplexed sensor systems of FIGS. 11 and 12 can also be used for temperature-compensated pressure sensing, or to compensate for other noise sources. For example, two sensors 116 and 117 in FIG. 11A can be located near each other so they are exposed to approximately the same temperature, with one of them being exposed to a reference pressure, and the other exposed to the pressure to be sensed. The detector results can be compared to eliminate or minimize thermal and/or other noise effects.

Figure 13A:
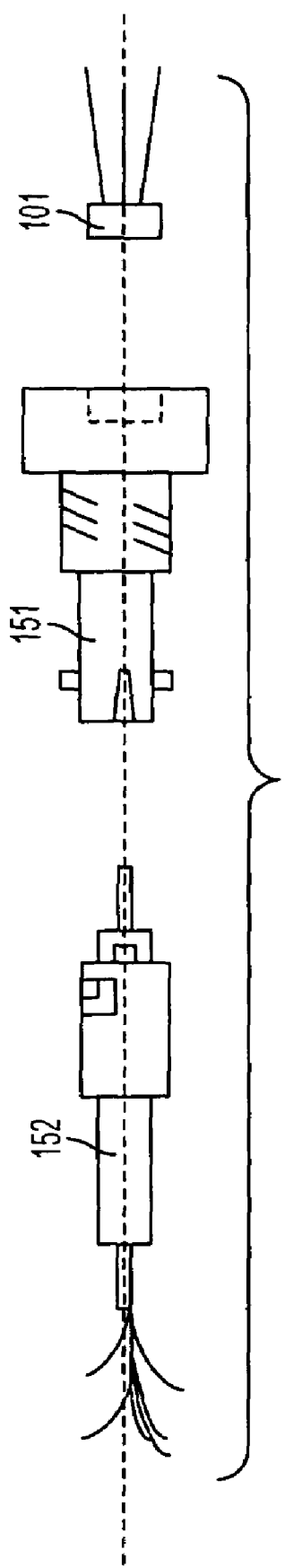
FIG. 13A-13B illustrate connectors suitable for use in a sensor system according to an embodiment of the invention.
Figure 13B:
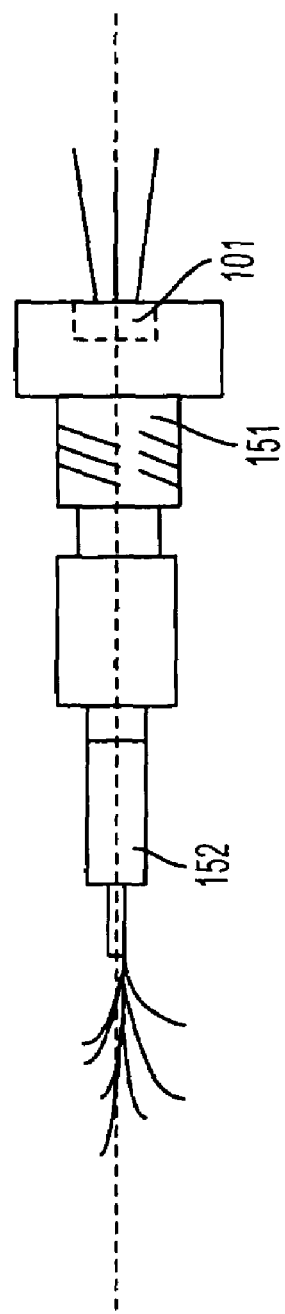

FIG. 13-14 illustrate fiber optic connection components suitable for use in the sensor systems of FIG. 9, 11 and 12. In particular, FIG. 13A shows a ST adaptor 151 modified to receive a LED 101, and a ST connector 152 modified to have a bore sufficient to receive the larger diameter optical fiber core. FIG. 13B shows the connectors 151 and 152 in their connected position. The end of the large diameter fiber in the connector 152 is held in position abutting or slightly separated from the LED surface by a spring-loaded mechanism in the connector/adaptor pair.

FIGS. 14A and 14B show the ST connector 152 modified to receive a larger diameter optical fiber, a ST adaptor 155, and a ST connector 156 modified to have a bore sufficient to receive the multiple smaller diameter optical fibers. The ends of the small diameter fibers in the connector 156 are held in position abutting or slightly separated from the surface of the larger diameter fiber in the connector 152 by spring-loaded mechanism in the connector/adaptor pairs.

The connectors and adaptors can be modified to include any number of optical fibers suitable for use in the systems of FIGS. 9, 11, and 12.

Referring again to FIG. 12, a fiber 147 can be arranged centrally so it is surrounded by the smaller diameter optical fibers 148. When the smaller diameter optical fibers are arranged to receive light from a larger diameter fiber 143 or from a LED, the central fiber 147 will have a light intensity of about three times the light intensity in the surrounding optical fibers, and the surrounding optical fibers will have approximately equal light intensities. The central fiber can be used to provide light to a sensor, for communication or for any other desired purpose.

Although this invention has been described in relation to the exemplary embodiments thereof, it is well understood by those skilled in the art that other variations and modifications can be affected on the preferred embodiment without departing from scope and spirit of the invention as set forth in the appended claims.

The invention claimed is:

1. A fiber optic sensor for measuring static pressure, the sensor comprising:
    a cartridge housing having an end that is exposed to the atmosphere;
    a thin flexible membrane in tension and covering the exposed end of the cartridge housing such that the flexible membrane has an exposed side and a protected side; and
    a fiber bundle disposed within the cartridge housing, the fiber bundle comprising at least one fiber having a first polished end for transmitting light toward the membrane and a second end for being coupled to a light source or a receiver,
    the housing arranged to maintain the membrane at a distance from the first end of the fiber in a direction along a fiber axis, with free space between the first fiber end and the protected side of the flexible membrane, the free space is sealed from the exterior of the sensor by the housing and the membrane,
    and light intensity received by the fiber after reflection by the thin flexible membrane corresponds to the static pressure external to the sensor at the exposed side of the membrane.

2. The fiber optic pressure sensor according to claim 1, wherein the exposed end of the cartridge housing extends beyond the first polished end of the fiber in a direction along the fiber axis.

3. The fiber optic static pressure sensor according to claim 1, wherein the protected side of the thin flexible membrane is reflective.

4. The fiber optic static pressure sensor according to claim 1, the fiber bundle having at least one receiving fiber for receiving light that is reflected by the membrane.

5. A fiber optic sensor for measuring static pressure, the sensor comprising:
    a cartridge housing having an end that is exposed to the atmosphere;
    a thin flexible membrane in tension and covering the exposed end of the cartridge housing such that the flexible membrane has an exposed side and a protected side; and
    a fiber bundle disposed within the cartridge housing, the fiber bundle comprising at least one fiber having a first polished end for transmitting light toward the membrane and a second end for being coupled to a light source or a receiver,
    the housing arranged to maintain the membrane at a distance from the first end of the fiber in a direction along a fiber axis, with free space between the first fiber end and the protected side of the flexible membrane, the free space is sealed from the exterior of the sensor by the housing and the membrane,
    and light intensity received by the fiber after reflection by the thin flexible membrane corresponds to the static pressure external to the sensor at the exposed side of the membrane, wherein the fiber bundle has a plurality of receiving fibers surrounding the transmitting fiber for receiving light reflected by the membrane.

6. The fiber optic static pressure sensor according to claim 5, wherein the fiber bundle has six receiving fibers surrounding the transmitting fiber for receiving light reflected by the membrane.

7. The fiber optic static pressure sensor according to claim 5, wherein the plurality of receiving fibers transmit the reflected light to a photodetector.

8. A method for sensing static pressure comprising:
transmitting light from an end of a first optical fiber in an optical bundle past an end of a housing that extends beyond the end of the fiber bundle;
said light being reflected by a reflective surface of a thin flexible membrane held in position by the housing with free space between the end of the fiber bundle and the membrane, wherein the thin flexible membrane is in tension and covers the exposed end of the cartridge housing such that the flexible membrane has an exposed side and a protected side, the free space is sealed from the exterior of the sensor by the housing and the membrane;
a plurality of receiving fibers surrounding the transmitting fiber of the fiber bundle receiving the reflected light from the reflective surface; and
said plurality of receiving fibers surrounding the transmitting fiber transmitting the reflected light to far ends of the plurality of receiving fibers;
an intensity of the light received in the plurality of receiving fibers being indicative of a pressure level external to the thin flexible membrane.

9. A method for sensing pressure in a human body, the method comprising:
positioning a sensor in the human body;
the sensor transmitting light from an end of a first optical fiber in an optical bundle past an end of a housing that extends beyond the end of the fiber bundle;
said light being reflected by a reflective surface of a thin flexible membrane held in position by the housing with free space between the end of the fiber bundle and the membrane, wherein the thin flexible membrane is in tension and covers the exposed end of the cartridge housing such that the flexible membrane has an exposed side and a protected side, the free space is sealed from the exterior of the sensor by the housing and the membrane;
at least a second optical fiber of the fiber bundle receiving the reflected light from the reflective surface; and
said second optical fiber transmitting the reflected light to a far end of the second optical fiber;
an intensity of the light received in the second optical fiber being indicative of a pressure level in the body.

10. The fiber optic pressure sensor of claim 1 wherein the cartridge housing comprises means to adjust the distance between the polished end of the transmitting fiber and the flexible membrane.

11. The fiber optic pressure sensor of claim 1, wherein the cartridge housing comprises means to adjust the tension of the flexible membrane drawn across the exposed end of the cartridge housing.

12. The method of claim 9, wherein the free space contains air.

13. The fiber optic pressure sensor according to claim 1, wherein the free space contains air.

14. The fiber optic pressure sensor according to claim 1, wherein the distance between the membrane and the polished end of the fiber is in a range of 180 microns to 200 microns.

15. The fiber optic pressure sensor according to claim 1, wherein the distance between the membrane and the polished end of the fiber is in a range of 0 microns to 150 microns.

16. The fiber optic pressure sensor according to claim 1, wherein the distance between the membrane and the polished end of the fiber is in a range of 0 microns to 120 microns.

* * * * *